(12) United States Patent
Festjens et al.

(10) Patent No.: US 12,117,315 B2
(45) Date of Patent: Oct. 15, 2024

(54) MAGNETIC POSITION SENSOR SYSTEM

(71) Applicant: Melexis Technologies SA, Bevaix (CH)

(72) Inventors: Martijn Festjens, Tessenderlo (BE); Jean-Claude Depoorter, Tessenderlo (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 139 days.

(21) Appl. No.: 17/957,046

(22) Filed: Sep. 30, 2022

(65) Prior Publication Data

US 2023/0100898 A1 Mar. 30, 2023

(30) Foreign Application Priority Data

Sep. 30, 2021 (EP) ..................................... 21200176

(51) Int. Cl.
*G01D 5/14* (2006.01)
(52) U.S. Cl.
CPC .................................... *G01D 5/145* (2013.01)
(58) Field of Classification Search
None
See application file for complete search history.

(56) References Cited

U.S. PATENT DOCUMENTS

| | | | |
|---|---|---|---|
| 5,115,194 A * | 5/1992 | Luetzow | H03K 17/9517 324/207.2 |
| 10,527,456 B2 | 1/2020 | Yoshiya | |
| 10,718,634 B2 | 7/2020 | Yoshiya | |
| 2003/0155911 A1 * | 8/2003 | Kaste | H03K 17/9517 324/207.2 |

(Continued)

FOREIGN PATENT DOCUMENTS

| | | |
|---|---|---|
| EP | 3273095 A1 | 1/2018 |
| WO | 2007054040 A2 | 5/2007 |

(Continued)

OTHER PUBLICATIONS

European Office Action from corresponding EP Application No. 21200176.2, Jan. 3, 2024.

(Continued)

*Primary Examiner* — Jas A Sanghera
(74) *Attorney, Agent, or Firm* — Workman Nydegger (57) ABSTRACT

In a first aspect, a magnetic position sensor system for a magnetic target, includes: (i) a first sensor for measuring in a first sensing region a first magnetic field component $B_{x,1}$ along a direction x and a second magnetic field component $B_{z,1}$ along a direction z, orthogonal to x; (ii) a second sensor for measuring in a second sensing region—aligned to the first sensing region along the x-direction—a first magnetic field component $B_{x,2}$ along the x-direction and a second magnetic field component $B_{z,2}$ along the z-direction; and (iii) an axially-magnetized ring magnet arranged under the first and second sensing region such that an axial direction of the ring magnet is substantially parallel to the z-direction and—in operation—a position of the ring magnet with respect to the first and second sensing regions is fixed.

13 Claims, 3 Drawing Sheets

(56) References Cited

U.S. PATENT DOCUMENTS

| | | |
|---|---|---|
| 2012/0045752 A1 | 2/2012 | Ensor et al. |
| 2015/0137796 A1* | 5/2015 | Ausserlechner ....... G01D 5/142 |
| | | 324/207.13 |
| 2017/0248445 A1 | 8/2017 | Ausserlechner |

FOREIGN PATENT DOCUMENTS

| | | |
|---|---|---|
| WO | 2016142691 A1 | 9/2016 |
| WO | 2017209628 A1 | 12/2017 |

OTHER PUBLICATIONS

Extended European Search Report from corresponding European Patent Application No. 2016613.9, Sep. 7, 2020.
International Search Report from corresponding PCT Application No. PCT/EP2021/058162, May 31, 2021.

\* cited by examiner

MAGNETIC POSITION SENSOR SYSTEM

TECHNICAL FIELD OF THE INVENTION

The present invention relates to magnetic position sensor systems, and more in particular to those which are adapted to reduce the influence of magnetic noise on the output signal.

BACKGROUND OF THE INVENTION

Various magnetic position sensor systems have been previously described, some of which included provisions to reduce the influence of magnetic noise on the output signal. U.S. Ser. No. 10/718,634B2 for instance disclosed a rotation angle detector comprising a magnet arranged to rotate around a rotation axis and a magnetic detection circuit comprising a first and second pair of magnetic detection elements arranged away from the rotation axis and having a predetermined interval between them. Therein, each of the first and second pair of magnetic detection elements is sensitive to both a first magnetic field in a circumferential direction and a second magnetic field in a normal direction. An output signal representative of the rotation angle of the magnet is then based on the outputs of said first and said second pair of magnetic detection elements.

In U.S. Ser. No. 10/718,634B2, the target to be detected is thus as such a magnet. By contrast, U.S. Ser. No. 10/527,456B2 disclosed a displacement detection device comprising a rotating measurement target with a concave or convex portion on its circumferential surface, a sensor having detection elements arranged in pairs with a predetermined interval and a magnet behind (with respect to the target) the sensor. The detection elements detect the displacement of the concave or convex portion as changes in the magnetic flux densities in the rotational axis direction and radial direction of the measurement target.

However, there is still a need in the art for magnetic position sensor systems which can detect targets without particular surface features (e.g. a concave or convex portion); and this preferably within a fairly broad range in space.

SUMMARY OF THE INVENTION

It is an object of the present invention to provide good magnetic position sensor systems for ferromagnetic targets. It is a further object of the present invention to provide good methods and uses associated therewith. This objective is accomplished by systems, methods and uses according to the present invention.

It is an advantage of embodiments of the present invention that they have a relatively large target sensing range.

It is an advantage of embodiments of the present invention that the sensing topology used—e.g. using gradient sensing—reduces the influence of magnetic noise. It is a further advantage of embodiments of the present invention that the influence of magnetic noise is reduced or even eliminated (e.g. making the magnetic position sensor system stray field immune).

It is an advantage of embodiments of the present invention that the sensors can be implemented using various sensor elements and arrangements thereof.

It is an advantage of embodiments of the present invention that the output of the sensors can be conveniently transformed into a position signal.

It is an advantage of embodiments of the present invention that that they are relatively they can be implemented in a relatively straightforward and economical fashion.

In a first aspect, the present invention relates to a magnetic position sensor system for a magnetic target, comprising: (i) a first sensor for measuring in a first sensing region a first magnetic field component $B_{x,1}$ along a direction x and a second magnetic field component $B_{z,1}$ along a direction z, orthogonal to x; (ii) a second sensor for measuring in a second sensing region—aligned to the first sensing region along the x-direction—a first magnetic field component $B_{x,2}$ along the x-direction and a second magnetic field component $B_{z,2}$ along the z-direction; and (iii) an axially-magnetized ring magnet arranged under the first and second sensing region such that an axial direction of the ring magnet is substantially parallel to the z-direction and—in operation—a position of the ring magnet with respect to the first and second sensing regions is fixed.

In a second aspect, the present invention relates to a method for determining a position of a magnetic target using a magnetic position sensor system as defined in any of the previous claims, comprising: (a) measuring in a first sensing region a first magnetic field component $B_{x,1}$ along a direction x and a second magnetic field component $B_{z,1}$ along a direction z, orthogonal to x; (b) measuring in a second sensing region—aligned to the first sensing region along the x-direction—a first magnetic field component $B_{x,2}$ along the x-direction and a second magnetic field component $B_{z,2}$ along the z-direction; (c) calculating a difference $dB_x$ between $B_{x,1}$ and $B_{x,2}$ and a difference $dB_z$ between $B_{z,1}$ and $B_{z,2}$; and (d) determining the position of the magnetic target from $dB_x$ and $dB_z$.

In a third aspect, the present invention relates to a use of an axially magnetized ring magnet in a magnetic position sensor system for a magnetic target, for extending a range within which the magnetic position sensor system can sense the magnetic target.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

In the different figures, the same reference signs refer to the same or analogous elements.

DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, above, below and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, a magnetic material is material which has a strong magnetization in an applied magnetic field; e.g. having a magnetic susceptibility $\chi$ of (in SI units) 50 or more, preferably 200 or more, yet more preferably 500 or more, such as 1000, 10000 or 100000 or more. The magnetic material may be a hard magnetic material (e.g. having an intrinsic coercivity $H_{ci}$ of 1000 A/m or more) or a soft magnetic (e.g. having an intrinsic coercivity $H_{ci}$ of less than 1000 A/m). In general, the magnetic material may have a bulk magnetization in the absence of a magnetic field (i.e. it may be a permanent magnet), but often will not. Thus, the magnetic material will often—in the absence of a magnetic field— either not be magnetized or have magnetic domains oriented such (e.g. randomly) that they cancel each outer out, so that is does not display any appreciable bulk magnetization. In preferred embodiments, the magnetic material may be a ferromagnetic material (e.g. a soft ferromagnetic material).

As used herein, and unless otherwise specified, a ring magnet is magnet having a hole (i.e. a through-hole) therein along its axial direction. Most typically, a cross-section through the ring magnet perpendicular to its axial direction may have a circular inner boundary and a circular outer boundary; in other words, the cross-section may be an annulus. Notwithstanding, the inner and outer boundary of the cross-section may more generally have any shape, such as a polygonal or even an irregular shape. The inner and outer boundary need also not have the same shape, but may be selected independently; for example the outer boundary could be circular and the inner boundary could be polygonal. Likewise, the height (H) of ring magnet need in general not be constant across its diameter (e.g. the ring magnet may have the shape of a torus), but will nevertheless in embodiment often be constant. Note that in the case of a non-circular inner and/or outer boundary, it may be more natural to speak more generally about the (inner/mean/outer) width along the x-direction instead of the (inner/mean/outer) diameter. In such cases, these terms may thus be exchanged as useful.

As used herein, and unless otherwise specified, a first direction may be considered substantially parallel to a second direction if it makes an angle with the second direction of between −10° and 10°, preferably between −5° and 5°, more preferably between −2° and 2°, yet more preferably between −1° and 1°, most preferably (perfectly) parallel (i.e. 0°).

In a first aspect, the present invention relates to a magnetic position sensor system for a magnetic target, comprising: (i) a first sensor for measuring in a first sensing region a first magnetic field component $B_{x,1}$ along a direction x and a second magnetic field component $B_{z,1}$ along a direction z, orthogonal to x; (ii) a second sensor for measuring in a second sensing region—aligned to the first sensing region along the x-direction—a first magnetic field component $B_{x,2}$ along the x-direction and a second magnetic field component $B_{z,2}$ along the z-direction; and (iii) an axially-magnetized ring magnet arranged under the first and second sensing region such that an axial direction of the ring magnet is substantially parallel to the z-direction and—in operation—a position of the ring magnet with respect to the first and second sensing regions is fixed.

Figure 1:
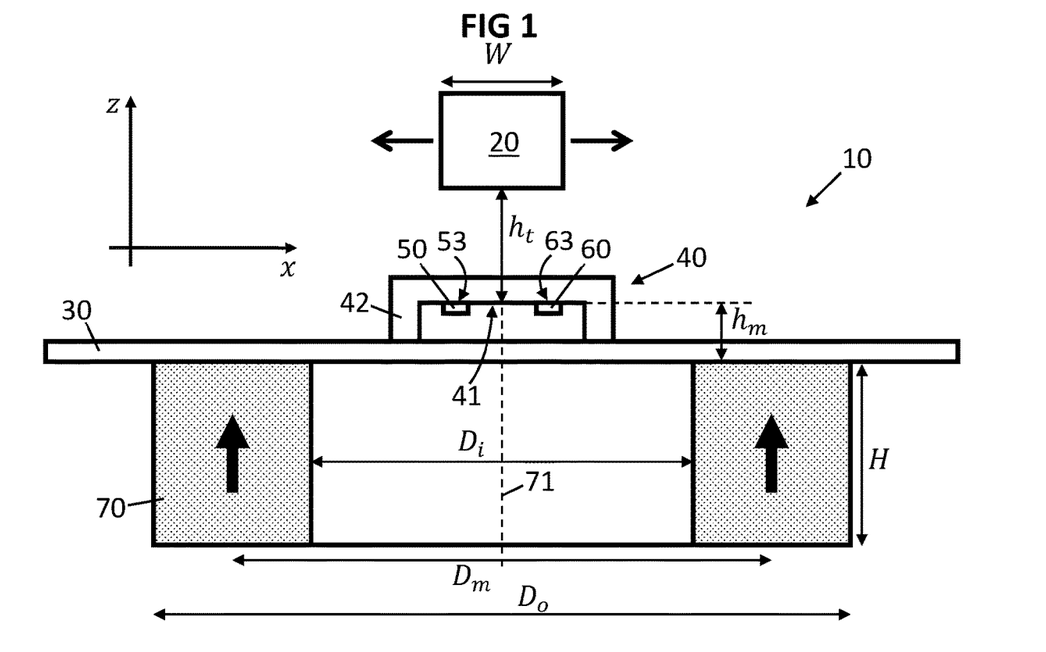
FIG. 1 schematically depicts a magnetic position sensor system and magnetic target in accordance with embodiments of the present invention.

An example of such a magnetic position sensor system 10 is schematically depicted in FIG. 1, showing a magnetic target 20, first sensor 50 and second sensor 60 (in a sensor chip 40 with chip substrate 41 and packaging 42) and ring magnet 70 with axial direction 71. Also depicted are sensing region 53 and 63 of the first and second sensors 50 and 60, respectively.

The sensing regions of the first and second sensors are the regions in which they sense their respective magnetic field components $B_{x,1}|B_{z,1}$ and $B_{x,2}|B_{z,2}$. If the magnetic field components in the x- and z-direction within one sensor are measured at (substantially) the same point or spot in space, the sensing region is thus simply that point/spot. However, each of the sensors may also comprise distinct sensing elements for determining the magnetic field components in the x- and z-direction. This is for example schematically depicted in FIG. 2 and FIG. 3, in which first sensor 50 has first sensing element 51 for measuring $B_{x,1}$ and second sensing element 52 for measuring $B_{z,1}$. Likewise, second sensor 60 has first sensing element 61 for measuring $B_{x,2}$ and second sensing element 62 for measuring the $B_{z,2}$. The first sensing elements 51 and 61 may for instance have a maximum axis of sensitivity perpendicular to the z-direction; they could for example be vertical Hall elements or magnetoresistance elements. The second sensing elements 52 and 62 may for instance have a maximum axis of sensitivity parallel to the z-direction; they could for example be horizontal Hall elements. When the sensors comprise distinct sensing elements, these sensing elements may not measure at the same point/spot in space but at two points/spots separated by a short distance (typically in the same order of magnitude as the size of the sensing elements, i.e. tens to hundreds of micron; for example between 10 and 200 μm, e.g. between 30 and 100 μm). In such cases, the sensing region is a region (e.g. a 1D or 2D area) defined by and comprising these sensing points or spots.

Figure 4:
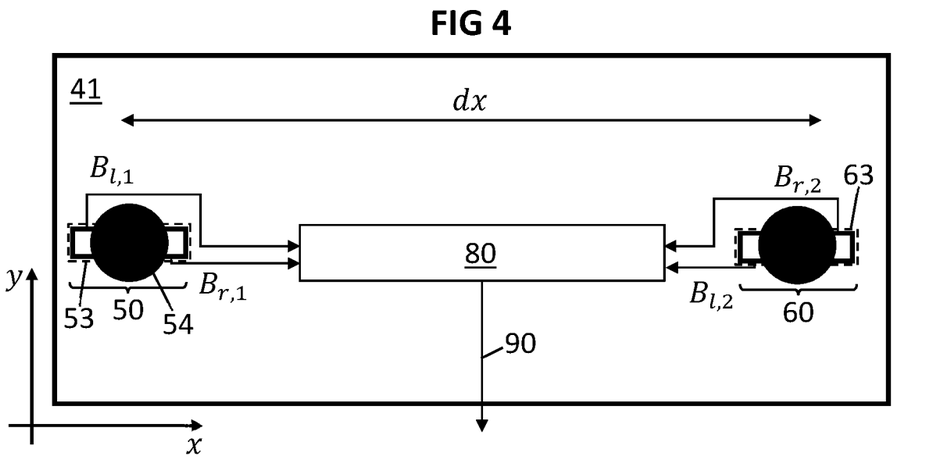

FIG. 4 schematically depicts still a further illustrative setup with distinct sensing elements but which do not measure $B_{x,1}$, $B_{z,1}$, $B_{x,2}$ and $B_{z,2}$ directly. Instead, each of sensor 50 and 60 is made up of two distinct sensing elements but having both a maximum axis of sensitivity parallel to the z-direction (e.g. horizontal hall elements), together with a magnetic concentrator 54 (e.g. a soft magnetic disk). The magnetic concentrator 54 bends the magnetic field lines and allows measurement of both in-plane and out-of-plane magnetic field components by the sensing elements. The sensing elements then output measured field components $B_{l,1}$, $B_{r,1}$, $B_{l,2}$ and $B_{r,2}$, which can be linearly combined into the x- and z-field components: $B_{x,1}=(B_{l,1}-B_{r,1})/2$, $B_{z,1}=(B_{l,1}+B_{r,1})/2$, $B_{x,2}=(B_{l,2}-B_{r,2})/2$ and $B_{z,2}=(B_{l,2}+B_{r,2})/2$.

Figure 2:
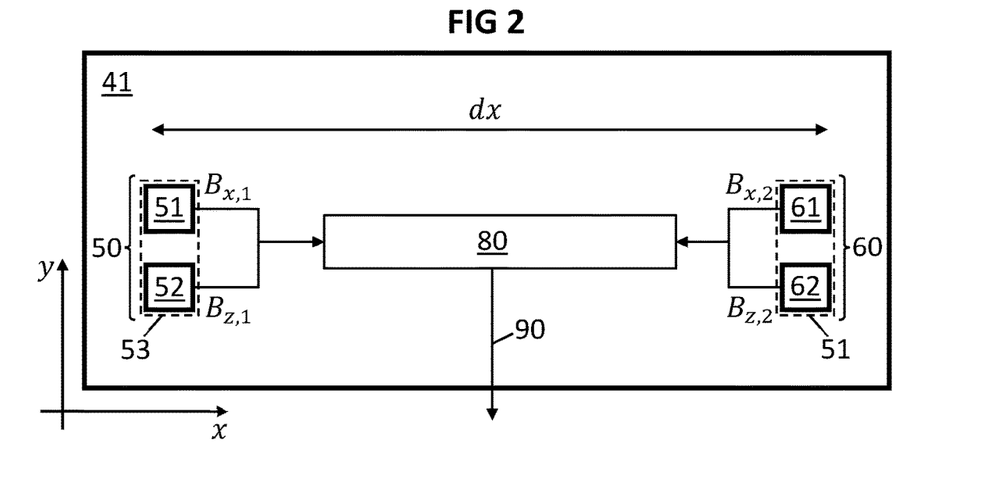
FIG. 2, FIG. 3 and FIG. 4 schematically depict sensor chips—with different arrangements of sensor elements—in accordance with embodiments of the present invention.
Figure 3:
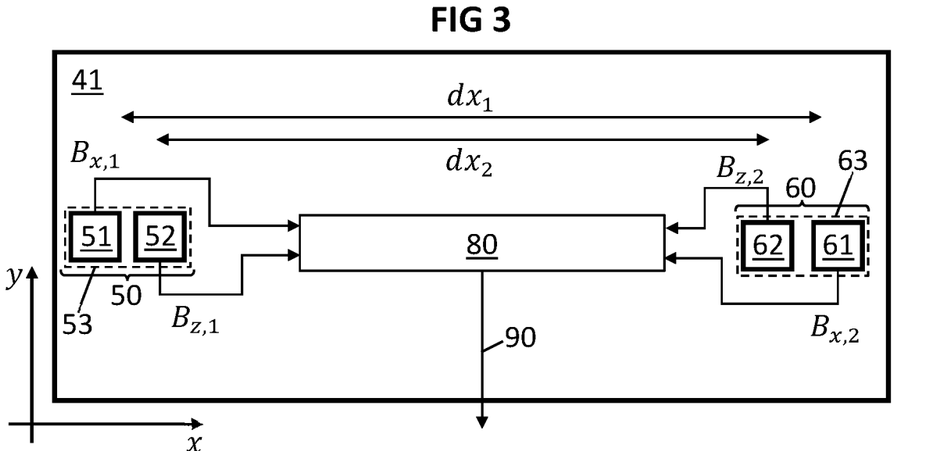

The first and second sensors—and thus the first and second sensing region—are typically separated from each other by a predetermined distance (typically in the order of mm, such as about 1 to 3 mm). In general, the distance between the points/spots at which $B_{x,1}$ and $B_{x,2}$ are measured can be referred to as $dx_1$, while the distance between the points/spots at which $B_{z,1}$ and $B_{z,2}$ are measured can be referred to as $dx_2$. In specific cases, it may be that $dx_1=dx_2=dx$; this is for instance so when the first and second sensing regions are sensing points/spots (cf. supra), or simply when the sensing elements are specifically arranged to the effect (e.g. they are aligned along the y-direction). The latter is schematically depicted in FIG. 2, whereas a situation in which $dx_1 \neq dx_2$ is schematically depicted in FIG. 3.

In embodiments, the magnetic position sensor system may further comprise a substrate arranged such that the first and second sensor are above the substrate and the ring magnet is below the substrate. For example—as schematically depicted in FIG. 1—the first and second sensor 50 and 60 (e.g. the sensor chip 40 in which they are integrated; cf. infra) may be mounted above the substrate 30 and the ring magnet 70 may be mounted below the substrate 30. In embodiments, the substrate may be a printed circuit board (PCB).

In embodiments, the axial direction of the ring magnet may (substantially) bisect a line segment connecting the first and second sensing region (e.g. connecting the centre of both region). In other words, the axial direction of the ring magnet may be the perpendicular bisector of said line segment. In embodiments, the axial direction may be considered to substantially bisect the line segment if its point of intersection is within a distance from the centre of the line segment of 10% or less of the total length of the line segment, preferably 5% or less, more preferably 2% or less, yet more preferably 1% or less.

Notwithstanding, an offset in the x-direction between the ring magnet and the first and second sensing regions, may be considered if an offset in the target sensing range is desired. Indeed, such an offset of the ring magnet could offset the target sensing range in the same direction, but typically in a nonlinear (and difficult to predict) manner. As such, some trial-and-error could be required to find a suitable ring magnet offset to achieve the desired target sensing range.

In embodiments, a top of the ring magnet may be at a height ($h_m$) below the first and second sensing region of between 5% and 100% of a mean diameter ($D_m$; i.e. the average of the inner diameter $D_i$ and outer diameter $D_o$) of the ring magnet, preferably between 10% and 80%, more preferably between 15% and 60%, yet more preferably between 20% and 40%.

In embodiments, an inner diameter ($D_i$) of the ring magnet may be between 25% and 95% of an outer diameter ($D_o$) of the ring magnet, preferably between 30% and 85%, more preferably between 35% and 75%, yet more preferably between 40% and 65%, most preferably between 45% and 55%.

Figure 5:
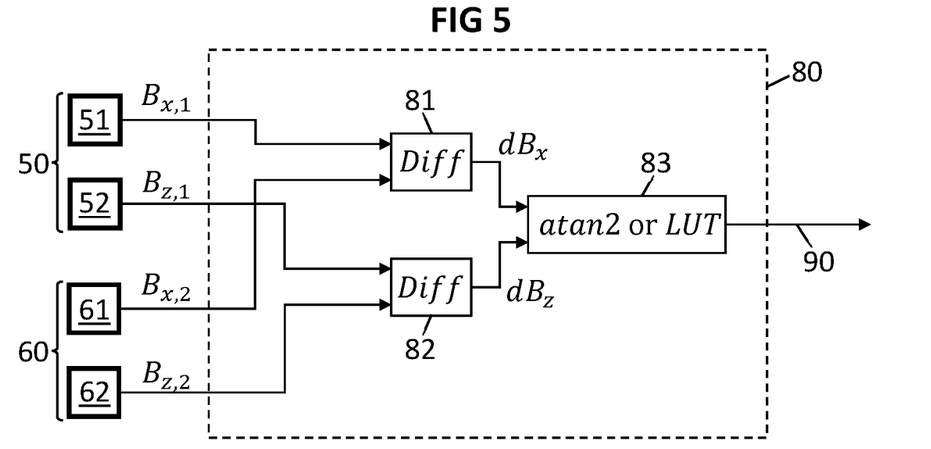
FIG. 5 schematically depicts a signal processing circuit in accordance with embodiments of the present invention

In embodiments, the magnetic position sensor system may further comprise a signal processing circuit. In embodiments, the signal processing circuit may comprise a first difference module for outputting a difference $dB_x$ between $B_{x,1}$ and $B_{x,2}$, and a second difference module for outputting a difference $dB_z$ between $B_{z,1}$ and $B_{z,2}$. In embodiments, the signal processing circuit may further comprise a module for generating an output signal from $dB_x$ and $dB_z$. Such a signal processing circuit 80 is schematically depicted in FIG. 5, showing difference modules 81 and 82 for calculating an outputting $dB_x$ and $dB_z$ from $B_{x,1}$, $B_{x,2}$, $B_{z,1}$ and $B_{z,2}$ output by sensors elements 51, 52, 61 and 62. Further illustrated is an output generating module 83 for e.g. calculating an atan2 using $dB_x$ and $dB_z$ or comprising a lookup table (LUT), and then sending the results off-chip through output/interface 90.

In embodiments, the first and second sensors—and, if present, the signal processing circuit—may be integrated in a single integrated circuit (IC); for example on a single IC substrate.

Although the magnetic position sensor system of the present invention is typically used with the ring magnet position fixed with regard to the first and second sensing regions, it will be clear that one can always make the ring magnet movable (e.g. possibly to allow making some adjustments in between measurements) but simply not use it while in operation (e.g. while performing the method in accordance with the second aspect). In other embodiments, the position of the ring magnet may be permanently fixed with respect to the first and second sensing regions.

In embodiments, any feature of any embodiment of the first aspect may independently be as correspondingly described for any embodiment of any of the other aspects.

In a second aspect, the present invention relates to a method for determining a position of a magnetic target using a magnetic position sensor system as defined in any of the previous claims, comprising: (a) measuring in a first sensing region a first magnetic field component $B_{x,1}$ along a direction x and a second magnetic field component $B_{z,1}$ along a direction z, orthogonal to x; (b) measuring in a second sensing region—aligned to the first sensing region along the x-direction—a first magnetic field component $B_{x,2}$ along the x-direction and a second magnetic field component $B_{z,2}$ along the z-direction; (c) calculating a difference $dB_x$ between $B_{x,1}$ and $B_{x,2}$ and a difference $dB_z$ between $B_{z,1}$ and $B_{z,2}$; and (d) determining the position of the magnetic target from $dB_x$ and $dB_z$.

In embodiments, a width (W) of the magnetic target along the x-direction may be between 1% and 300% of a mean diameter ($D_m$) of the ring magnet, preferably between 5% and 200%, more preferably between 10% and 100%. The target to be detected is typically not particularly limited by its shape. Nevertheless, the method of the present invention is particularly suited for detecting magnetic targets having a size not exceeding that of the ring magnet by too much. Indeed, once the target becomes exceedingly large, a displacement in the x-direction could well be such that it does not change the magnetic field components measurable by the magnetic position sensor system, thereby hindering the detection of the target and/or the movement. In such a case, an approach such as in U.S. Ser. No. 10/718,634B2 may prove more fruitful.

Moreover, although not necessarily strictly limited thereto, the method of the present invention is particularly suited to detect a linear motion (parallel to the x-direction) of the target. In the regard, the magnetic position sensor system could also be referred to as a magnetic linear position sensor system.

In embodiments, the magnetic target may be at a fixed height ($h_t$) above the first and second sensing region. In embodiments, the fixed height ($h_t$) may be between 1% and 100% of a mean diameter ($D_m$) of the ring magnet, preferably between 3% and 50%, more preferably between 2% and 35%.

In embodiments, the position determined in step d may be related to $$\frac{dB_x/dx_1}{dB_z/dx_2}\left(\text{or }\frac{k \cdot dB_x/dx_1}{dB_z/dx_2}\right).$$

In embodiments, the position may be linearly related to (e.g. proportional to) one of the above expressions. Herein $dB_x$ is $B_{x,1}-B_{x,2}$, $dB_z$ is equal to $B_{z,1}-B_{z,2}$, $dx_1$ is the distance between the two sensing spots at which the magnetic field component $B_{x,1}$ and the magnetic field component $B_{x,2}$ are measured, and $dx_2$ is the distance between the two sensing spots at which the magnetic field component $B_{z,1}$ and the magnetic field component $B_{z,2}$ are measured. If $dx_1=dx_2$, the above expressions thus simplify to $dB_x/dB_z$ and $k \cdot dB_x/dB_z$. Moreover, k is an optional factor to allow amplitude correction between the field gradients. Note though that since k is a simple multiplication factor in the above expressions, a position related to $k \cdot dB_x/dx_1/dB_z/dx_2$ is also related to $dB_x/dx_1/dB_z/dx_2$.

In embodiments, the position determined in step d may more specifically be related to atan2($dB_z/dx_1$, $k \cdot dB_x/dx_2$), wherein atan2(y, x) is a function which modifies the arctangent atan(y/x) based on the signs of x and y (i.e. based on a form of quadrant detection) so that the range of the function becomes [0°, 360°]. Again, if $dx_1=dx_2$, this expression simplifies to atan2($dB_z/k \cdot dB_x$). Note that the choice of which term to use as x and which as y (i.e. the choice of numerator and denominator in the atan function) only changes the location of 0°, while the sign of these terms only changes the slope (ascending or descending) of the atan2 output, so that both can be arbitrarily selected. As such, the position determined in step d may likewise be related to atan2 ($-dB_z/dx_1$, $k \cdot dB_x/dx_2$)atan2($k \cdot dB_x/dx_2$, $dB_z/dx_1$) or atan2 ($-k \cdot dB_x/dx_2$, $dB_z/dx_1$).

In embodiments, determining the position in step d may further comprise linearizing an intermediate result (e.g. $dB_x/dx_1$ and $dB_z/dx_2$ as such, the ratio of both or the an atan2 of both) to obtain the position. In some embodiments, linearizing the intermediate result may be performed using a linearization function. Such a linearization function could for example be derived from a measured response of the intermediate results in function of the position (see e.g. Example 1 and Example 2). In other embodiments, linearizing the intermediate result may be performed using on a lookup table, optionally using interpolation between the lookup table data points. In embodiments, the lookup table could be based on any of $dB_x/dx_1$ and $dB_z/dx_2$ as such, the ratio of both or the atan2 of both. Using the ratio (or the atan2, which uses said ratio indirectly) is advantageous in that it reduces or cancels out the influence of temperature; indeed, temperature effects which impact $dB_x/dx_1$ and $dB_z/dx_2$ are typically proportional, so that the ratio of $dB_x/dx_1$ and $dB_z/dx_2$ tends to remain substantially unaffected.

In embodiments, any feature of any embodiment of the second aspect may independently be as correspondingly described for any embodiment of any of the other aspects.

In a third aspect, the present invention relates to a use of an axially magnetized ring magnet in a magnetic position sensor system for a magnetic target, for extending a range within which the magnetic position sensor system can sense the magnetic target.

The effect of the ring magnet on the range within which the magnetic position sensor system can sense (e.g. detect and/or determine the position of) the magnetic target is for instance illustrated in Example 1, Example 2 and the Comparative Example below, wherein it is clear that the use of a ring magnet (i.e. with a hole along the axial direction) yields a much more performant magnetic position sensor system than when using a similar disk magnet (i.e. without hole). In embodiments, the range may be extended compared to a disk magnet having the same outer dimensions (e.g. same outer diameter and same height) and made of the same material as the ring magnet, or compared to a disk magnet having the same outer dimensions and having the same residual flux density (also referred to as 'remanence') as the ring magnet. Without being bound by theory, it is believed that the hole in the ring magnet spreads the spatial gradients over a longer distance and thereby results in a considerably longer sensing range.

In embodiments, the range may be extended to between 80% and 200% of a mean diameter ($D_m$) of the ring magnet, preferably between 95% and 180%, more preferably between 110% and 160%, yet more preferably between 125% and 140%.

The extension of the sensing range is typically governed by an interplay of the inner diameter ($D_i$) and outer diameter ($D_o$) of the ring magnet. On the one hand, the effect of the hole spreading the spatial gradients over longer distances leads to the range being related to the inner diameter ($D_i$). On the other hand, the outer diameter ($D_o$) indirectly determines the amount of magnetic material and thus also the magnet's strength, in turn also influencing the sensing range.

In embodiments, any feature of any embodiment of the third aspect may independently be as correspondingly described for any embodiment of any of the other aspects.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1

Referring to the schematic depiction in FIG. 1, a magnetic position sensor system 10 in accordance with the present invention was made by mounting a Melexis MLX90371 dual disk sensor chip 40 (MLX90371GDC-BCC-200-RE) onto a printed circuit board 30 (PCB) and gluing an axially magnetized ring magnet 70 below (behind) the sensor chip 40 on the opposite side of the PCB 30. The axially magnetized ring magnet 70 was a 1.35 T NdFeB ring magnet with an annular cross-section, outer diameter $D_o$ of 10 mm, inner diameter $D_i$ of 5 mm (so that the average diameter $D_i$ was 7.5 mm) and height H of 5 mm. It was positioned such that its axial direction was substantially normal to the PCB 30 (i.e. substantially parallel to the z-direction) and substantially aligned with the sensing regions 53 and 63 of the sensor chip 40's first sensor 50 and second sensor 60 (i.e. the axial direction of the ring 70 substantially bisected a line segment connecting the first and second sensing regions 53 and 63). The height difference $h_m$ between the top of the ring magnet 70 and the first and second sensing regions 53 and 63 was about 2 mm.

To test the magnetic position sensor system 10, the magnetic position sensor system 10 was mounted on an adjustable stage and coupled to a Melexis daughter board (PTC04-DB-HALL06) to interface with the sensor chip 40. A ferromagnetic screw bit was then positioned above (in front of) the magnetic position sensor system 10 as magnetic target 20.

Figure 6:
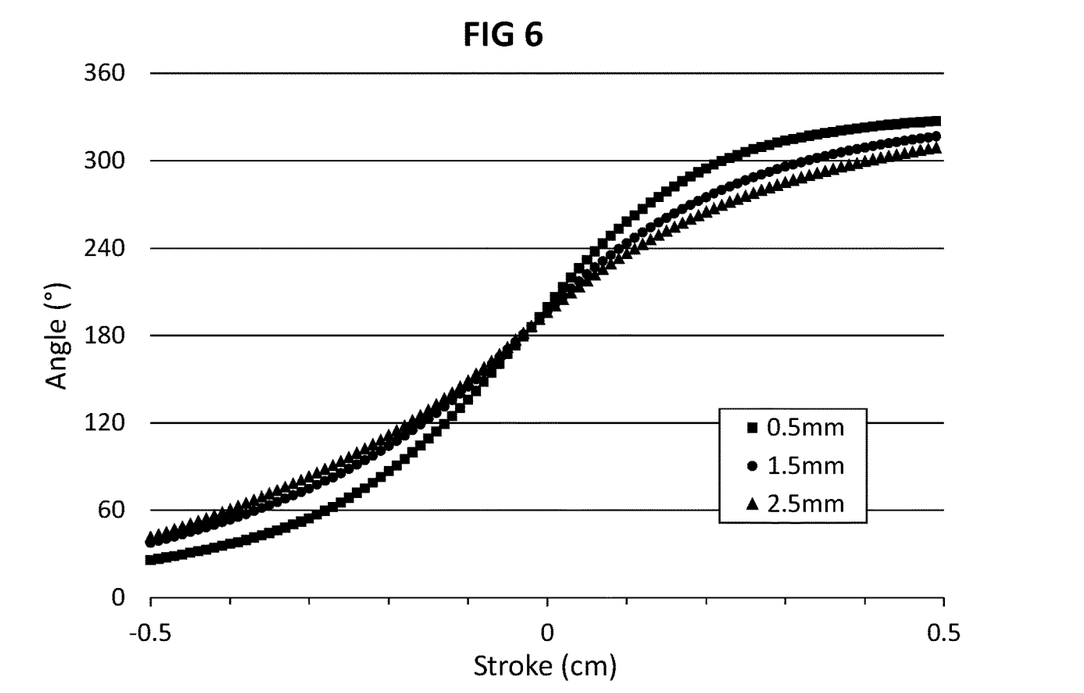
FIG. 6 and FIG. 7 are graphs of an atan2-angle in function of a target stroke (i.e. a displacement in the x-direction) in accordance with Example 1 and Example 2.

Next, the magnetic target 20 was held in place at a fixed distance $h_t$ from the first and second sensing regions 53 and 63, while the magnetic position sensor system 10 was moved in the x-direction; thereby simulating a linear movement of the magnetic target 20 with respect to the magnetic position sensor system 10. This caused changes in the magnetic field components $B_{x,1}$ and $B_{z,1}$ measured by the first sensor 50 and in the magnetic field components $B_{x,2}$ and $B_{z,2}$ measured by the second sensor 60. Using—with $dx_1=dx_2$—the equation $$a\tan2\left(\frac{dB_z/dx_2}{k.dB_x/dx_1}\right) = a\tan2\left(\frac{dB_z}{k.dB_x}\right) = a\tan2\left(\frac{B_{z,1}-B_{z,2}}{k.(B_{x,1}-B_{x,2})}\right).$$

the outputs of the first and second sensors 50 and 60 could be turned into an angle which depends on the stroke (i.e. the displacement in the x-direction). A typical response for the screw bit target 20 is presented in FIG. 6, showing the angle—calculated from the measured magnetic field components (and setting k to 1)—in function of the applied stroke for different fixed distances $h_t$ of 0.5, 1.5 mm and 2.5 mm.

Based on this response, it was possible to formulate one or more look-up-tables and/or linearization functions to deduce—for a target 20 at a predefined distance $h_t$—the (unknown) position from the calculated angle. Accordingly, it was possible for the present magnetic position sensor system 10 to detect a linear displacement of the target over a range of about 10 mm (between −5 to 5 mm with respect to the centre between the first and second sensing regions 53 and 63).

Example 2

Figure 7:
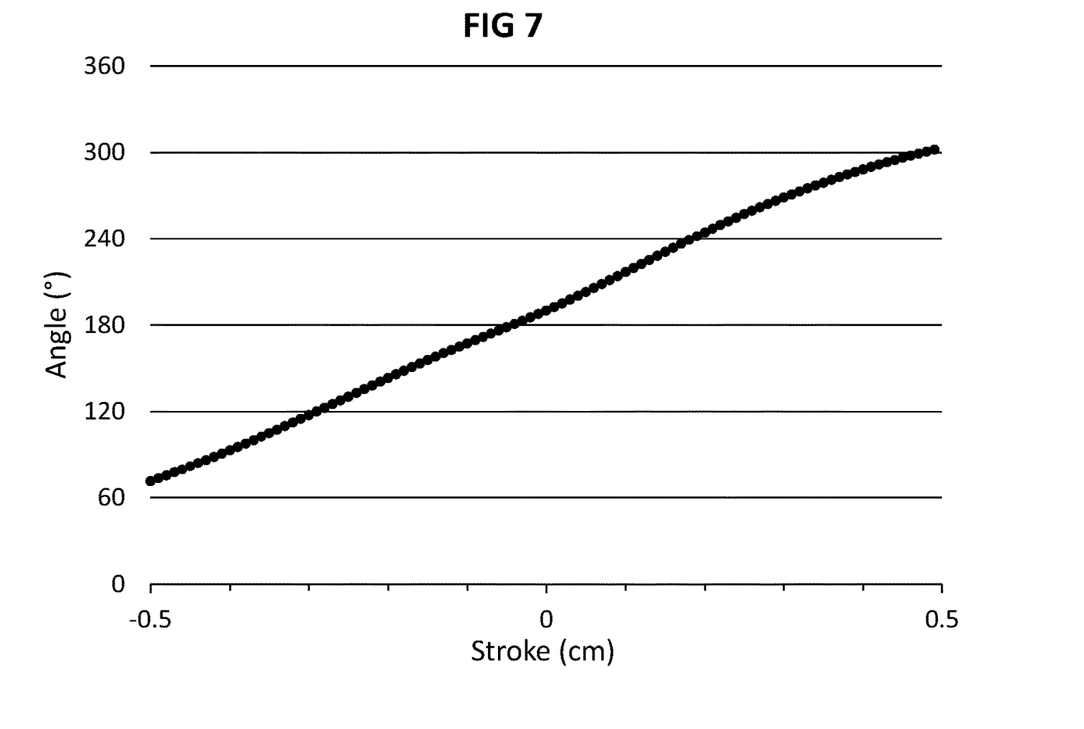

Example 1 was repeated but using as target 20 a ferromagnetic nut instead of the ferromagnetic screw bit. A typical response as obtained for this nut target 20—for a single fixed distance $h_t$—is presented in FIG. 7. Accordingly, it was again possible for the present magnetic position sensor system 10 to detect a linear displacement of the nut target 20 over a range of about 10 mm.

Comparative Example

Example 1 was repeated but using an axially magnetized disk magnet (with similar characteristics as the ring magnet) instead of the ring magnet. However, this change resulted in a setup which was notably less sensitive, to such an extent that the detectable range was reduced to about 1 mm.

It is to be understood that although preferred embodiments, specific constructions, configurations and materials have been discussed herein in order to illustrate the present invention. It will be apparent to those skilled in the art that various changes or modifications in form and detail may be made without departing from the scope of the invention as defined in the appended claims.

The invention claimed is:

1. A magnetic position sensor system for a magnetic target, comprising:
   i) a first sensor for measuring in a first sensing region
      a first magnetic field component $B_{x,1}$ along a direction x and
      a second magnetic field component $B_{z,1}$ along a direction z, orthogonal to x;
   ii) a second sensor for measuring in a second sensing region-aligned to the first sensing region along the x-direction—
      a first magnetic field component $B_{x,2}$ along the x-direction and
      a second magnetic field component $B_{z,2}$ along the z-direction; and
   iii) an axially-magnetized ring magnet arranged under the first and second sensing region such that an axial direction of the ring magnet is substantially parallel to the z-direction and—in operation—a position of the ring magnet with respect to the first and second sensing regions is fixed.

2. The magnetic position sensor system according to claim 1, further comprising a substrate arranged such that the first and second sensor are above the substrate and the ring magnet is below the substrate.

3. The magnetic position sensor system according to claim 1, wherein the axial direction of the ring magnet substantially bisects a line segment connecting the first and second sensing region.

4. The magnetic position sensor system according to claim 1, wherein a top of the ring magnet is at a height below the first and second sensing region of between 5% and 100% of a mean diameter of the ring magnet.

5. The magnetic position sensor system according to claim 1, wherein an inner diameter of the ring magnet is between 25% and 95% of an outer diameter of the ring magnet.

6. The magnetic position sensor system according to claim 1, further comprising a signal processing circuit.

7. The magnetic position sensor system according to claim 6, wherein the signal processing circuit comprises
   a first difference module for outputting a difference $dB_x$ between $B_{x,1}$ and $B_{x,2}$, and
   a second difference module for outputting a difference $dB_z$ between $B_{z,1}$ and $B_{z,2}$.

8. The magnetic position sensor system according to claim 7, wherein the signal processing circuit further comprises a module for generating an output signal from $dB_x$ and $dB_z$.

9. The magnetic position sensor system according to claim 1, the first and second sensors are integrated in a single integrated circuit.

10. A method for determining a position of a magnetic target using a magnetic position sensor system as defined in claim 1, comprising:
    a) measuring in a first sensing region
       a first magnetic field component $B_{x,1}$ along a direction x and
       a second magnetic field component $B_{z,1}$ along a direction z, orthogonal to x;
    b) measuring in a second sensing region-aligned to the first sensing region along the x-direction—
       a first magnetic field component $B_{x,2}$ along the x-direction and
       a second magnetic field component $B_{z,2}$ along the z-direction;
    c) calculating a difference $dB_x$ between $B_{x,1}$ and $B_{x,2}$ and a difference $dB_z$ between $B_{z,1}$ and $B_{z,2}$; and
    d) determining the position of the magnetic target from $dB_x$ and $dB_z$.

11. The method according to claim 10, wherein the position determined in step d is related to $$\frac{dB_x/dx_1}{dB_z/dx_2}.$$

12. The method according to claim 10, wherein the magnetic target is at a fixed height above the first and second sensing region.

13. The method according to claim 10, wherein a width of the magnetic target along the x-direction is between 1% and 300% of a mean diameter of the ring magnet.

* * * * *